March 7, 1950 V. WOUK ET AL 2,499,806
GAS CONSTITUENCY AUDIBLE INDICATING DEVICE
Filed July 27, 1945
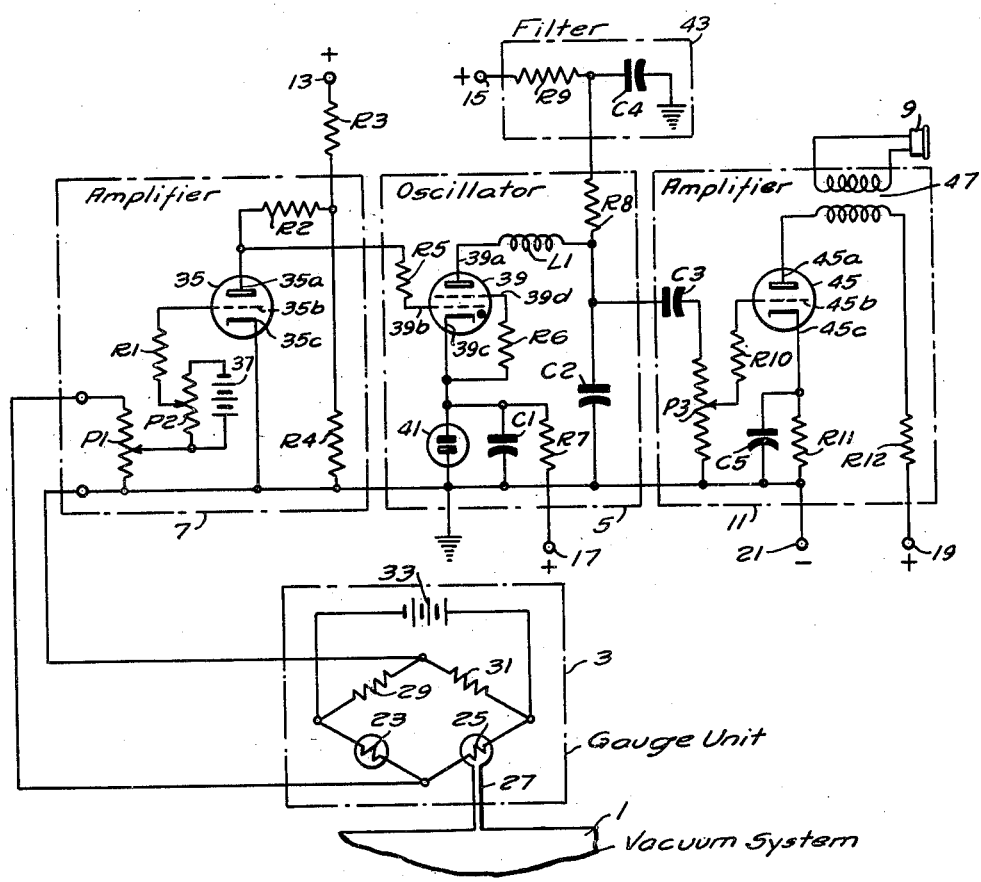
WITNESSES:
INVENTORS
Victor Wouk and
Wilson M. Brubaker.
BY
ATTORNEY Patented Mar. 7, 1950

2,499,806

UNITED STATES PATENT OFFICE 2,499,806

GAS CONSTITUENCY AUDIBLE INDICATING DEVICE

Victor Wouk and Wilson M. Brubaker, Pittsburgh, Pa., assignors to Westinghouse Electric Corporation, East Pittsburgh, Pa., a corporation of Pennsylvania Application July 27, 1945, Serial No. 607,406

2 Claims. (Cl. 177—311)

This invention relates to devices responsive to a change in condition, and it has particular relation to gauge assemblies responsive to a change in the constituency of a gaseous medium, such as the contents of a vacuum system.

Devices responsive to a change in condition must indicate the change in some readily discernible manner. In prior art practice it has been common to employ indicating instruments for indicating the change in condition in a manner discernible by the eye of an operator. In some cases, however, discernment of a change in condition by the eye of an operator is inconvenient. For the purpose of discussion, the invention will be considered with respect to a gauge device designed to depict the change in condition of a gaseous medium, such as the contents of a vacuum system. When a gauge device is employed in locating leaks present in a vacuum system, it is common practice for a first operator to apply a suitable material, such as a gas, to the suspected portion of the vacuum system. If a leak is present at this point, the applied material produces a change in the gaseous medium within the vacuum system or a decrease in the pressure within the vacuum system. This change in condition of the contents of the vacuum system is accompanied in a change in the reading of the indicating instrument included in the associated gauge device. The change in reading of the indicating instrument is noted by a second observer who reports the change to the first observer. This technique requires two observers and is inconvenient. If desired, an extension cord may be employed for the indicating instrument to permit its location adjacent the first observer. This would require a division of his attention.

Consideration has been given to the replacement of the indicating instrument by a transducer capable of producing an audible sound which varies in amplitude in accordance with the change in condition of the contents of the vacuum system. Such a transducer has at least two objectionable characteristics. It is difficult to detect changes in amplitude of sound in noisy surroundings. Furthermore, the amplitude of sound emitted by the transducer is dependent on the gain of an electronic amplifier which ordinarily must be associated therewith. If the gain of the amplifier varies in accordance with some function other than the change in condition to be determined, the amplitude of sound emitted by the transducer does not accurately portray the change in condition. Changes in gain of the amplifiers may be due to variations in ambient temperature or changes in elements of the amplifier.

In accordance with the invention a change in condition is depicted by a change in pitch or frequency of sound emitted by a transducer. Such a change in pitch is readily discernible by an operator. Not only is the ear sensitive to variations in the pitch of sound but such variations may be readily noted despite the presence of noise. If the teachings of the invention are followed, a single operator can readily trace leaks in a vacuum system.

It is therefore an object of the invention to provide an improved device responsive to a change in condition.

It is a further object of the invention to provide a gauge device for depicting a change in the constituency of a gaseous medium by means of a change in pitch or frequency of sound emitted by a transducer.

Other objects of the invention will be apparent from the following description taken in conjunction with the accompanying drawing in which the single figure is a schematic view of a system embodying the invention.

Referring to the drawing, the single figure shows a gauge device suitable for detecting a change in the constituency of a gaseous medium contained within a vacuum system 1. The device includes a gauge unit 3 which may be of any desired type capable of producing an output dependent on the change in condition which is to be determined. If the gauge unit is to be responsive to a change in constituency of the contents of the vacuum system 1, it may, for example, take the form of an ionization gauge or a Pirani gauge. Such gauges are well known in the art, and a discussion thereof and of leak hunting may be found in a book entitled Procedures in Experimental Physics by John Strong, published by Prentice Hall, Incorporated, New York, 1938. If desired, a mass spectrometer leak hunter may be employed as the gauge unit 3.

The output of the gauge unit 3 is employed for controlling the frequency of oscillation of an oscillation generator 5. This oscillation generator may be of any desired construction capable of producing a frequency of oscillation which is responsive to the input to the oscillation generator from the gauge unit. If the output of the gauge unit 3 is insufficient to control the oscillation generator 5, an amplifier 7 of conventional construction may be interposed between the gauge unit and the oscillation generator.

The output of the oscillation generator 5 is employed for controlling the energization of a transducer 9 which may be in the form of earphones or a loudspeaker. Consequently, the pitch or frequency of the sound emitted by the transducer 9 is a function of the change in condition to be determined. If the output of the oscillation generator 5 is insufficient to energize adequately the transducer 9, an amplifier 11 of any suitable construction may be interposed between the oscillation generator and the transducer 9.

In order to illustrate the invention more particularly, specific circuit elements are illustrated for each component of the gauge device. Certain sources of energy for the gauge device are depicted by polarity markings. For example, positive terminals 13, 15, 17 and 19 are shown which have a common negative terminal 21 associated therewith. This negative terminal may be grounded. The positive terminals may represent separate sources or a common source of energy associated with the gauge device.

The gauge unit 3 conveniently may take the form of a standard Pirani gauge. The Pirani gauge includes two substantially equal resistors 23 and 25 which have substantial temperature coefficients of resistance. The resistor 23 may be enclosed in a high vacuum, and the resistor 25 may be enclosed in a container which is connected through a duct 27 to the vacuum system which is to be studied. Consequently, the atmosphere surrounding the resistor 25 will depend upon the constituency of the gas present within the vacuum system 1. The resistors 23 and 25 are associated with two resistors 29 and 31 to form a Wheatstone bridge. Energy for the bridge is supplied from a suitable source, such as a battery 33. The output of the Wheatstone bridge is applied across the potentiometer P1.

If desired, the output of the Wheatstone bridge may be amplified in any suitable manner. As shown on the drawing, an electron triode tube 35 may be employed for this purpose. This triode has a plate electrode 35a, a control electrode 35b and a cathode 35c. An adjustable bias is applied between the control and cathode electrodes of the triode by means of a potentiometer P2 which is connected across a suitable source of energy, such as a battery 37. For the specific tube hereinafter set forth, the potentiometer P2 may be connected to apply a negative bias to the tube 35. The voltage between the movable tap on the potentiometer P1 and ground also is included in the control electrode circuit of the triode 35. Consequently, the voltage between the control and cathode electrodes of the triode 35 is the sum of the bias voltage applied by the potentiometer P2 and the portion of the Wheatstone bridge output which is supplied from the potentiometer P1. The control electrode 35b is connected to the potentiometer P2 through a grid resistor R1. The plate electrode 35a of the triode is connected through a plate resistor R2 to an intermediate point on a voltage divider formed by two resistors R3 and R4. The output of the amplifier 7 is applied through a resistor R5 to the oscillation generator 5. It should be noted that the amplifier 7 is essentially a direct-current or direct-coupled amplifier.

The oscillation generator 5 may take the form of a relaxation oscillator employing a gaseous discharge tetrode 39 of the type commonly referred to as a thyratron. This tetrode includes a plate electrode 39a, a control electrode 39b, a shield electrode 39d and a cathode electrode 39c.

A bias voltage is introduced in the control electrode circuit of the tetrode 39 in any suitable manner. For example, this bias may comprise the voltage drop across a neon glow tube 41, which is energized from the terminal 17 through a voltage dropping resistor R7. A bypass capacitor C1 is connected across the neon glow tube. The shield electrode 39d is connected to the cathode through a resistor R6, and the control electrode 39b is connected to the plate of the triode 35 through the resistor R5.

The voltage applied between the plate and cathode electrode of the tetrode 39 is determined in part by the voltage across a capacitor C2 which is connected to the plate electrode 39a through an inductance L1. The capacitor C2 is charged from the terminal 15 through a decoupling filter 43 which includes a resistor R9 and a capacitor C4. The rate of charge of the capacitor C2 is determined substantially by a resistor R8.

Relaxation oscillators are well known in the art. As is well understood, the capacitor C2 charges until the voltage thereacross together with the voltages applied to the control electrode of the tetrode 39 are sufficient to initiate a discharge of the capacitor C2 through the tetrode. Upon completion of this discharge operation, the capacitor C2 again is charged. This cycle is repeated indefinitely to provide an alternating output.

As previously pointed out, the output of the oscillation generator is employed for controlling the energization of the transducer 9. Ordinarily, it will be desirable to include the amplifier 11 between the transducer and the oscillation generator. In the specific embodiment shown on the drawing, the amplifier 11 includes a triode 45 having a plate electrode 45a, a control electrode 45b and a cathode 45c. The output of the oscillation generator is coupled through a coupling capacitor C3 across a potentiometer P3. The adjustable tap of the potentiometer P3 is connected through a grid resistor R10 to the control electrode 45b of the triode. The triode is self-biased by means of a cathode resistor R11 which has a bypass capacitor C5 connected thereacross. The plate electrode 45a is connected to the terminal 19 through the primary of an output transformer 47 and a resistor R12. The secondary of the output transformer 47 is connected to the transducer 9.

It is believed that the operation of the device shown in the drawing is apparent from the foregoing discussion. With the gauge unit 3 proportioned for zero output or a predetermined output as desired, the proportion of the output of the gauge unit which is selected before amplification is determined by the setting of the tap on the potentiometer P1. The setting of this tap determines the change in frequency of the oscillation generator relative to the change in output of the gauge unit. Consequently, the potentiometer P1 may be termed a sensitivity control. The potentiometer P2 may be adjusted to determine the frequency of the oscillation generator when the gauge unit 3 is in its balanced or predetermined normal condition. In practice it has been found convenient to adjust the potentiometer P2 for a frequency output of the order of 60 cycles per second. If the frequency of 60 cycles per second is selected, a change in the output of the gauge unit 3 may suffice to interrupt completely the oscillation normally produced by the oscillation generator. This interruption of oscillation is very readily noted by the observer. The amplitude of the sound emitted by the transducer 9 may be adjusted by variation in the setting of the tap on the potentiometer P3. Consequently, the potentiometer P3 may be termed a manual volume control.

After the device has been properly adjusted, an operator may attempt to locate leaks in the vacuum system 1 as by spraying gas over suspected areas of the system. If a leak is present, the output of the gauge unit varies. In turn, the variation in output of the gauge unit results in variation of the frequency of oscillation of the oscillation generator and the pitch of the sound emitted by the transducer 9. If the output of the gauge unit varies in such a direction as to increase in a positive direction the voltage applied to the control electrode $35b$ of the triode 35, the frequency of the oscillation generator and the pitch of the sound emitted by the transducer 9 decreases. Conversely, as an output of the gauge unit 3 changes to decrease the positive voltage of the control electrode $35b$ relative to the associated cathode, the frequency of the oscillation generator and the pitch of the sound emitted by the transducer 9 increase. Since the ear is sensitive to such frequency variations, the operator readily ascertains the presence of a leak. It should be noted that the pitch of sound emitted by the transducer 9 is substantially independent of the gain of the amplifier 11. Moreover, the operator can discern changes in pitch of sound emitted by the transducer despite the presence of the appreciable background noise.

Although the components of the gauge device may vary appreciably, the triodes 35 and 45 may comprise respectively a type 6SN7GT tube and a type 6A3 tube. The gaseous discharge tetrode 39 may be a type 2051 tube. When these tubes are employed, the following additional values may be adopted:

$P_1 = 5$ megohms
$P_2 = 2$ megohms
$P_3 = 200,000$ ohms
$R_1 = 2$ megohms
$R_2 = 0.2$ megohm
$R_3, R_4 = 25,000$ ohms
$R_5 = 0.1$ megohm
$R_6 = 0.5$ megohm
$R_7 = 0.4$ megohm
$R_8 = 0.5$ megohm
$R_9 = 10,000$ ohms
$R_{10} = 0.1$ megohm
$R_{11} = 1,000$ ohms
$R_{12} = 500$ ohms
$C_1 = 0.1$ mfd.
$C_2 = 0.004$ mfd.
$C_3 = 0.005$ mfd.
$C_4 = 8$ mfd.
$C_5 = 10$ mfd.
Battery 37 = 7.5 volts
$L_1 = 30$ millihenries
terminals 13, 15, 17 and 19 = 300 volts to ground With a gauge device of this type an input change of $\frac{1}{40}$ of a volt produces a change in pitch of sound emitted by the transducer 9 which can be readily discerned.

Although the invention has been described with reference to certain specific embodiments thereof, numerous modifications are possible. Therefore, the invention is to be restricted only by the appended claims as interpreted in view of the prior art.

We claim as our invention:

1. In a device for representing a change in the constituency of a gaseous medium, a gauge responsive to the constituency of a gaseous medium for producing a direct electrical voltage having an amplitude dependent on the deviation of the gaseous medium from a predetermined constituency, a relaxation oscillator comprising a gaseous discharge tube, said tube having a control electrode responsive to a direct electrical quantity for controlling the frequency of the relaxation oscillator, means for energizing said control element in accordance with the amplitude of the electrical voltage, electroresponsive transducer means for producing a sound output, and means for energizing said transducer means in accordance with the generator oscillator output to produce sound having a pitch controlled by the frequency of the oscillator output, said control electrode being biased to a value differing only slightly from the value required to stop oscillation of said relaxation oscillator, whereby a slight change in the constituency of the gaseous medium from said predetermined constituency results in a cessation of sound from the transducer means.

2. In a device for representing a change in the constituency of a gaseous medium, a gauge responsive to the constituency of a gaseous medium for producing a direct electrical voltage having an amplitude dependent on the deviation of the gaseous medium from a predetermined constituency, an electrical oscillation generator having a control element responsive to a direct electrical quantity for determining the frequency of alternation of the generator output, means for energizing said control element in accordance with the amplitude of the electrical voltage, transducer means for producing a sound output, and means for energizing said transducer means in accordance with the generator output to produce sound having a pitch controlled by the frequency of alternation of the generator output, said generator control element being biased to a value differing only slightly from the value required to produce substantially no sound from the transducer means, whereby a slight change in the constituency of the gaseous medium results in a substantial cessation of sound from the transducer means.

VICTOR WOUK.
WILSON M. BRUBAKER.

REFERENCES CITED

The following references are of record in the file of this patent:

UNITED STATES PATENTS

| Number | Name | Date |
|---|---|---|
| 1,304,208 | Shakespeare | May 20, 1919 |
| 1,881,394 | Aull | Oct. 4, 1932 |
| 1,965,147 | Marvel | July 3, 1934 |
| 1,999,215 | Smith | Apr. 30, 1935 |
| 2,004,662 | Junkers | June 11, 1935 |
| 2,295,570 | Dunmore | Sept. 15, 1942 |
| 2,378,395 | Dickson | June 19, 1945 |
| 2,383,321 | Kleber | Aug. 21, 1945 |
| 2,395,368 | Bull | Feb. 19, 1946 |